(12) United States Patent
Cheng et al.

(10) Patent No.: US 11,242,896 B2
(45) Date of Patent: Feb. 8, 2022

(54) SPLINE SLIP CONSTANT VELOCITY JOINT

(71) Applicant: Zhejiang CFMOTO Power Co., Ltd., Zhejiang (CN)

(72) Inventors: Fuying Cheng, Hangzhou (CN); Zhenxiang Kuang, Hangzhou (CN); Jiajun Li, Hangzhou (CN)

(73) Assignee: Zhejiang CFMOTO Power Co. Ltd., Zhejiang (CN)

( * ) Notice: Subject to any disclaimer, the term of this patent is extended or adjusted under 35 U.S.C. 154(b) by 503 days.

(21) Appl. No.: 16/201,629

(22) Filed: Nov. 27, 2018

(65) Prior Publication Data

US 2019/0120297 A1 Apr. 25, 2019

Related U.S. Application Data

(63) Continuation-in-part of application No. 16/039,687, filed on Jul. 19, 2018, now Pat. No. 11,125,277.

(30) Foreign Application Priority Data

Jul. 19, 2017 (CN) .......................... 201720880127.6
Jul. 19, 2017 (CN) .......................... 201720880153.9
Nov. 27, 2017 (CN) .......................... 201721610364.7

(51) Int. Cl.
*F16D 3/223* (2011.01)
*F16D 3/224* (2011.01)
(Continued)

(52) U.S. Cl.
CPC .............. *F16D 3/223* (2013.01); *F16D 1/116* (2013.01); *F16D 3/224* (2013.01); *F16D 2001/103* (2013.01); *F16D 2003/22313* (2013.01)

(58) Field of Classification Search
CPC .......... F16D 3/06; F16D 3/223; F16D 3/2245; F16D 3/227; F16D 2003/22313;
(Continued)

(56) References Cited

U.S. PATENT DOCUMENTS 2,987,897 A * 6/1961 Spence .................. F16D 3/224
464/906
3,218,827 A 11/1965 Aucktor
(Continued)

FOREIGN PATENT DOCUMENTS

CN 201078412 Y 6/2008
CN 201763841 U 3/2011
(Continued)

*Primary Examiner* — Josh Skroupa
(74) *Attorney, Agent, or Firm* — Shewchuk IP Services, LLC; Jeffrey D. Shewchuk

(57) ABSTRACT

A constant velocity ball joint uses a star shaped sleeve with a splined connection to its shaft. The sleeve is longitudinally retained on its shaft using a retaining ring in an outwardly facing groove of the shaft. The star shaped sleeve has a 30° assembly assist chamfer angle on one side, as well as a 45° transition chamfer angle and a 65° ramp chamfer angle facing the opposite direction. These angles control the diameter of the retaining ring as it is compressed inward into the groove during assembly and disassembly. The star shaped sleeve can be used in a dynamic length CV joint, with the splines of a configuration that allows longitudinal sliding of the sleeve on the shaft, so the shell of the dynamic length CV joint still can be of the spherical race type.

17 Claims, 7 Drawing Sheets

(51) Int. Cl.
*F16D 1/116* (2006.01)
*F16D 1/10* (2006.01)

(58) Field of Classification Search
CPC ... F16D 2003/2232; F16D 2003/22323; F16D 2003/22326; F16D 3/224; Y10S 464/906; Y10T 403/7026; Y10T 403/7033; Y10T 403/7035
USPC ........ 403/359.1, 359.5, 359.6; 464/143, 162, 464/906
See application file for complete search history.

(56) References Cited

U.S. PATENT DOCUMENTS

| | | | |
|---|---|---|---|
| 3,442,095 A | | 5/1969 | Devos |
| 3,464,232 A | | 9/1969 | Hutchinson |
| 3,789,626 A | | 2/1974 | Girguis |
| 4,068,499 A | | 1/1978 | Sharp |
| 4,511,346 A | | 4/1985 | Hazebrook et al. |
| 4,573,947 A | | 3/1986 | Hazebrook et al. |
| 4,838,832 A | * | 6/1989 | Schmitt .................. F16D 3/06 403/359.6 |
| 4,909,774 A | | 3/1990 | Muller |
| 5,624,318 A | | 4/1997 | Jacob et al. |
| 5,647,801 A | | 7/1997 | Jacob |
| 5,692,961 A | | 12/1997 | Turner |
| 6,306,045 B1 | | 10/2001 | Jacob |
| 6,443,844 B1 | | 9/2002 | Perrow |
| 6,582,313 B2 | | 6/2003 | Perrow |
| 7,077,753 B2 | | 7/2006 | Kuczera et al. |
| 7,311,167 B2 | | 12/2007 | Takayanagi et al. |
| 7,614,818 B2 | * | 11/2009 | Gutierrez ................ F16D 1/116 403/359.5 |
| 8,066,575 B2 | * | 11/2011 | Kobayashi .............. F16D 3/223 464/906 |
| 8,197,349 B2 | | 6/2012 | Terada et al. |
| 8,371,767 B2 | | 2/2013 | Uhl et al. |
| 8,388,457 B2 | | 3/2013 | Keller |
| 8,403,764 B2 | | 3/2013 | Kobayashi |
| 8,425,142 B2 | | 4/2013 | Disser |
| 8,499,457 B2 | | 8/2013 | Kobayashi et al. |
| 8,512,157 B2 | | 8/2013 | Harada et al. |
| 8,556,737 B2 | | 10/2013 | Yamauchi et al. |
| 8,771,092 B2 | * | 7/2014 | Fujio .................... F16D 3/2245 464/906 |
| 8,864,591 B2 | | 10/2014 | Sugiyama et al. |
| 9,611,897 B2 | | 4/2017 | Edwards et al. |
| 10,253,819 B2 | * | 4/2019 | Sherlock ................ F16D 1/116 |
| 2012/0172137 A1 | * | 7/2012 | Yamazaki ............... F16D 1/116 464/182 |

FOREIGN PATENT DOCUMENTS

| | | | | |
|---|---|---|---|---|
| CN | 202108891 U | | 1/2012 | |
| CN | 203847579 U | | 9/2014 | |
| CN | 205118031 U | | 3/2016 | |
| JP | 06193642 A | * | 7/1994 | ............ F16D 3/223 |
| WO | WO-2006080132 A1 | * | 8/2006 | ............ F16D 3/224 |
| WO | WO-2007090429 A1 | * | 8/2007 | ............ F16D 3/224 |
| WO | WO-2009037936 A1 | * | 3/2009 | ............ F16D 3/227 |

* cited by examiner

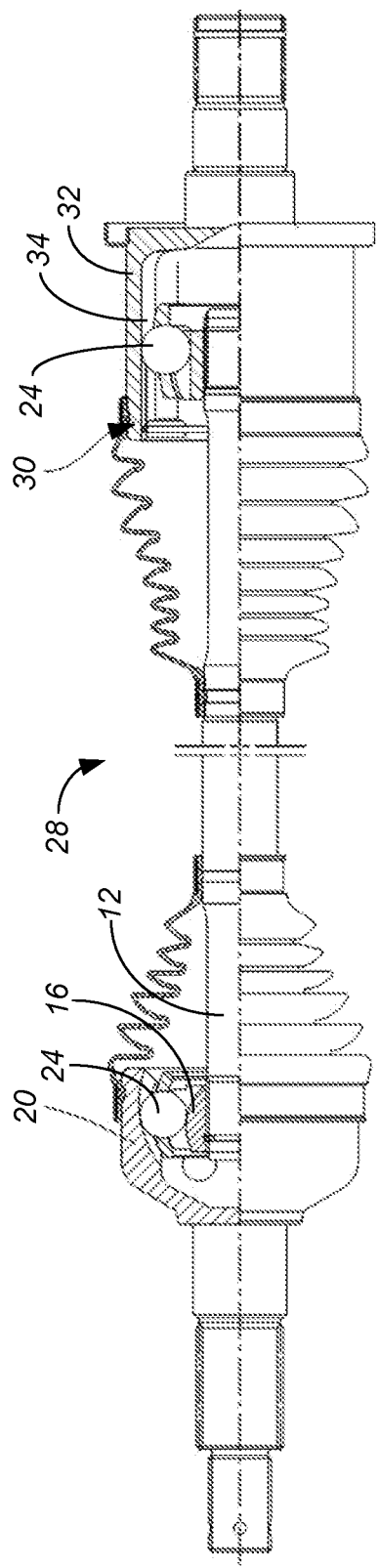
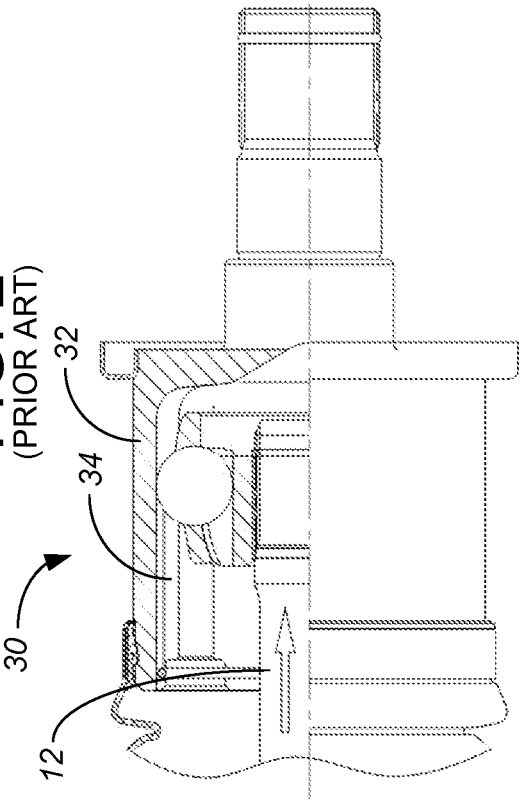
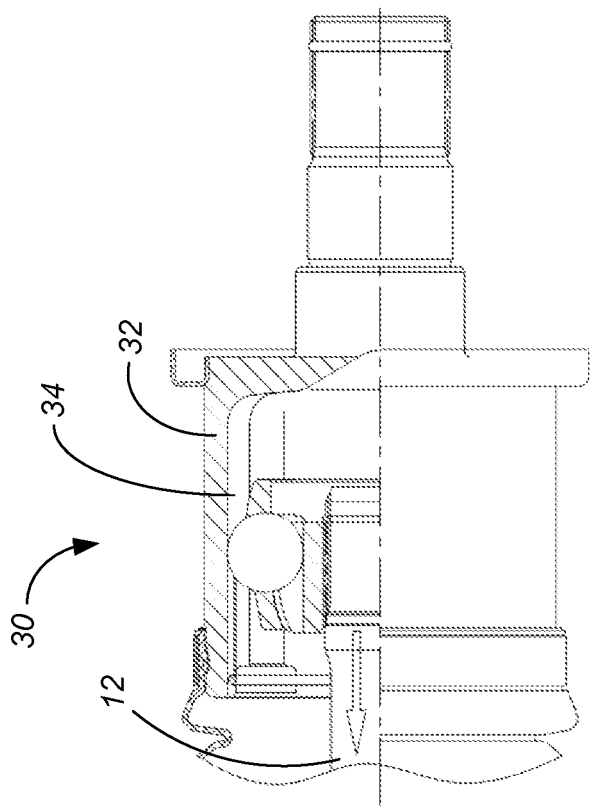
FIG. 2
FIG. 3 (PRIOR ART)
FIG. 4 (PRIOR ART)

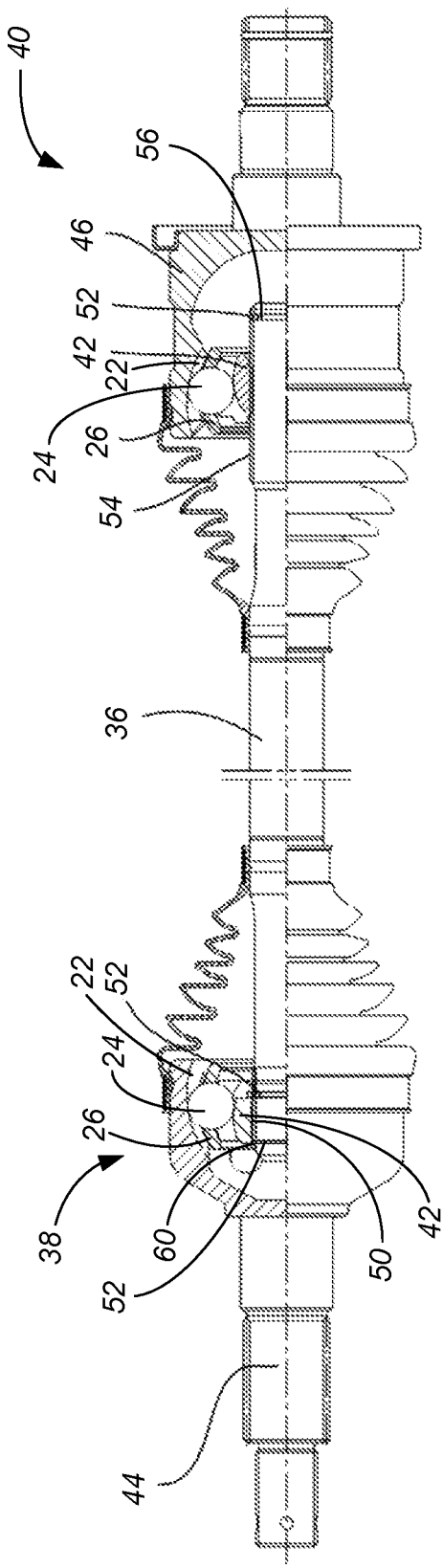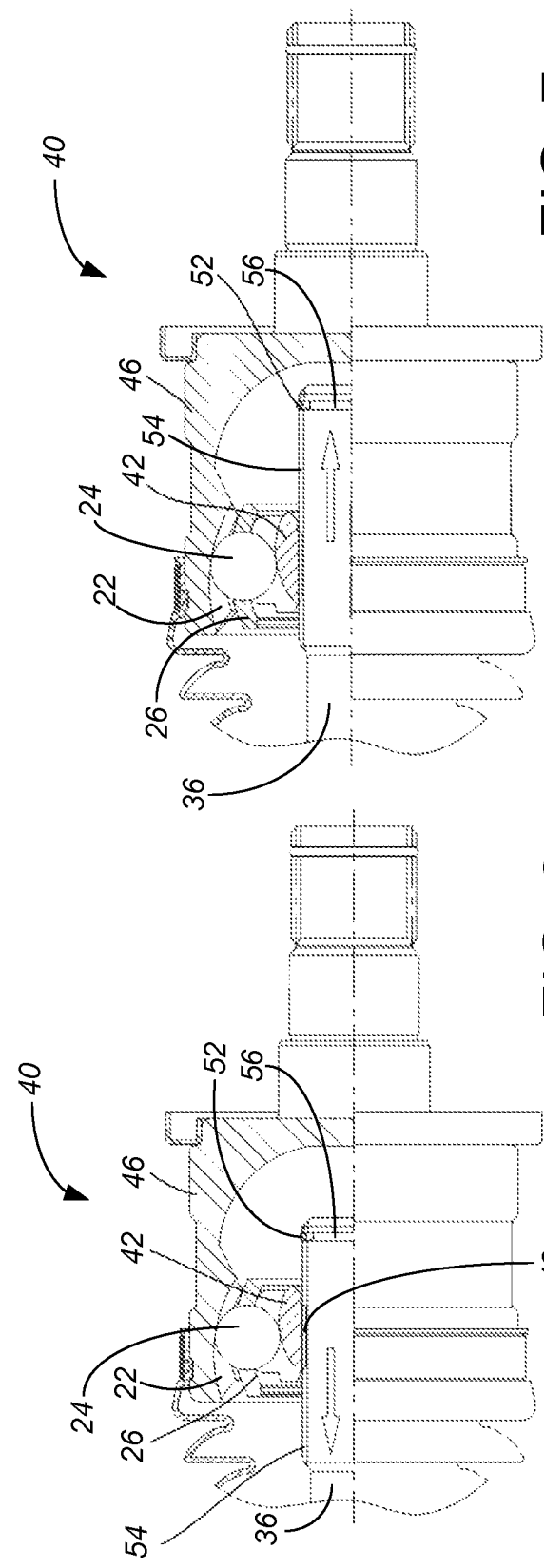
FIG. 5
FIG. 6
FIG. 7

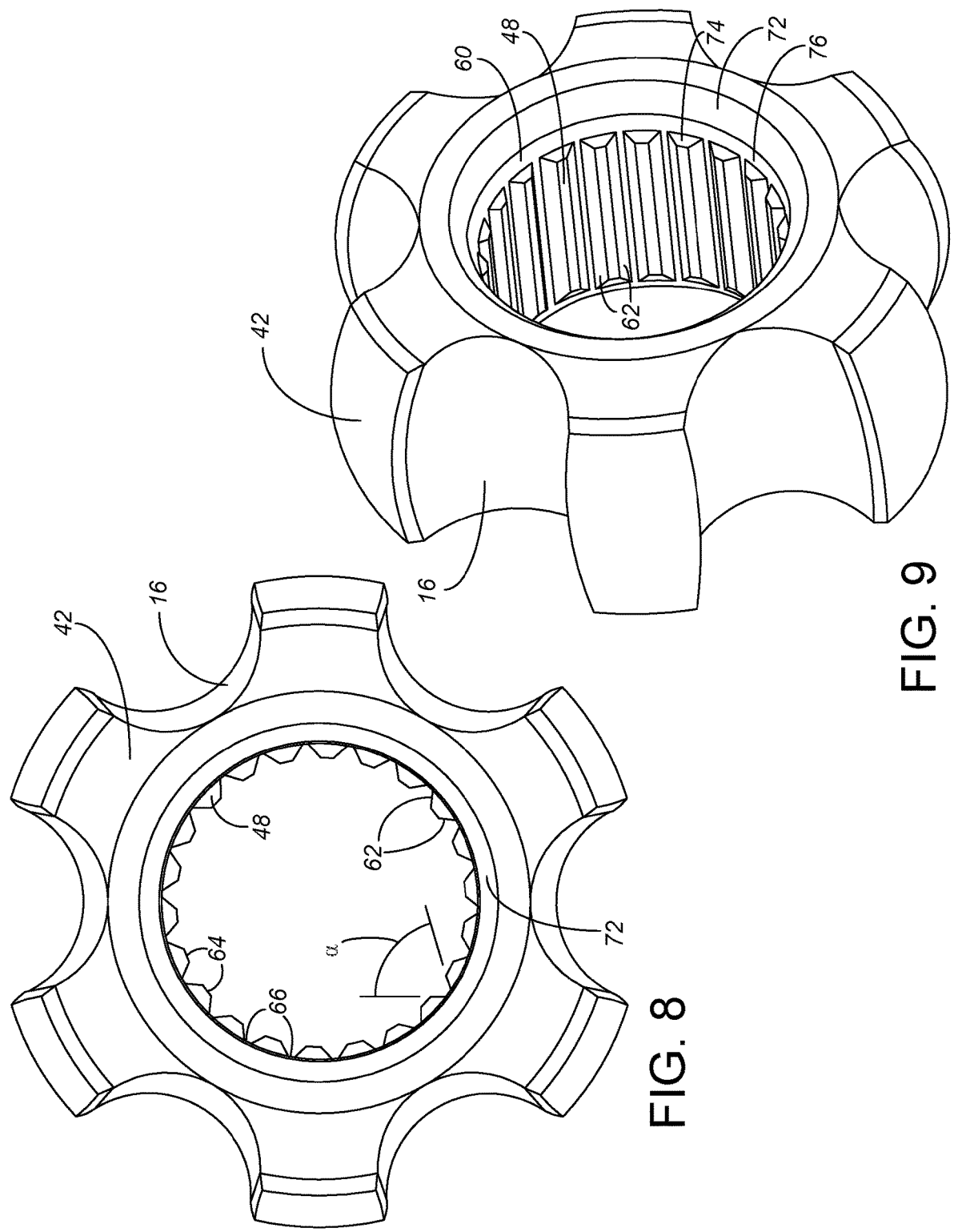

SPLINE SLIP CONSTANT VELOCITY JOINT

CROSS-REFERENCE TO RELATED U.S. APPLICATION(S)

This is a continuation-in-part of U.S. application Ser. No. 16/039,687, filed Jul. 19, 2018 and entitled Type Of Constant Velocity Joint With The Spline Slip Structure, incorporated by reference.

FIELD OF THE INVENTION

The invention relates to the technical field of universal or constant velocity joints, such as used in the driving wheels of motor vehicles. More particularly, the invention relates to such universal or constant velocity joints and their assembly and disassembly, particularly suited for off road vehicles.

BACKGROUND OF THE INVENTION

Constant velocity ("CV") joints, also sometimes called universal joints, are well known and commonly used to transmit torque between two shafts while allowing pivoting of one of those shafts relative to the other. Some CV joints use balls to transmit torque, and are sometimes called ball joints, Rzeppa ball joints or Birfield ball joints. Examples of such CV joints are shown in U.S. Pat. Nos. 7,311,167, 8,403,764, 8,499,457 and 8,512,157, incorporated by reference. A basic construction of one prior art CV joint 10 is shown in FIG. 1. An end of one shaft 12 is connected into a star shaped inner joint member or sleeve 14, in this example having six outwardly facing ball slots 16. An end of the other shaft 18 is connected into a shell (also called a "bell") 20 defining a star shaped recess with a corresponding number (in this case six) of inwardly facing ball slots 22. Ball bearing members 24 are rotationally and longitudinally retained in a ball cage 26, one ball bearing member 24 in each set of inwardly and outwardly facing ball slots 16, 22. The balls 24 can transmit torque from one shaft 12, 18 to the other, while allowing angular pivoting between the shafts 12, 18, such as during either suspension movement or steering movement of a driven wheel (not shown).

In some of these CV joints, the joint allows some lengthwise or axial movement between the input and output shafts, in addition to the significant angular articulation. For instance, the lengthwise movement can be used to adjust for wheel run-out during suspension movement, where the distance between the wheel (not shown) and the differential (not shown) will change by a few millimeters. The lengthwise movement can also be used during turning.

FIG. 2 shows a half shaft 28 which uses two CV joints 10, 30, one at each end of the half shaft 28, with the CV joint 30 at right permitting lengthwise movement. The lengthwise movement can be seen by the comparison between FIGS. 3 and 4, in which the position of the ball bearings 24 and cage 26 telescopes from longer (FIG. 3) to shorter (FIG. 4) within the shell 32. The lengthwise or telescoping movement is achieved in the shell 32 with the outer races 34 for the balls 24 being generally cylindrical, rather than the spherical races 22 of the shell 20 of the fixed-length CV joint 10. While the dynamic-length CV joint 30 of FIGS. 2-4 permits some lengthwise movement, its structural strength is reduced relative to a fixed-length CV joint 10, i.e., the structural strength of the spherical CV joint 10 shown at left in FIG. 2 is greater than the structural strength of the cylindrical CV joint 30 shown at right in FIG. 2 and shown in FIGS. 3 and 4. Further, particularly when the cylindrical CV joint 30 is in the shortened configuration (FIG. 4), the maximum amount of pivoting movement is reduced due to interference between the shaft 12 and the shell 32 at high angles. U.S. Pat. Nos. 3,218,827, 3,442,095, 3,464,232, 4,068,499, 4,511,346, 4,573,947, 6,443,844 and 6,582,313, incorporated by reference, show similar CV joints which allow some lengthwise or axial movement between the input and output shafts, in addition to the significant angular articulation.

These issues with reduced structural strength and reduced amount of pivoting movement are particularly exposed when the vehicle, instead of being intended for travel on pavement, is an off road vehicle. Off road vehicles, such as utility vehicles ("UVs") and all terrain vehicles ("ATVs"), are well known for travel over a wide variety of terrains, including over unpaved trails or fields, rocks, etc. In general, such off road vehicles require greater amounts of suspension travel than on-road vehicles. As the wheels of off-road vehicles hit various obstacles, the stresses placed on the CV joints is greater than in on-road travel. The prior art CV joint 30 is too easily damaged for the requirements of use in off road vehicles. Assembly of the CV joint should be easy and quick, and disassembly, in case of damage when one or more component parts needs to be replaced, should also be easy and quick. Better solutions are needed.

BRIEF SUMMARY OF THE INVENTION

The present invention is a constant velocity joint using a star shaped sleeve with a splined connection to its shaft, including a profile that improves the assembly and disassembly process, as well as the star shaped sleeve configuration itself and the method of disassembly (and/or assembly) using the star shaped sleeve. The star shaped sleeve, which can be used either in a longitudinally fixed constant velocity joint or more preferably in a dynamic length constant velocity joint, is longitudinally retained on its shaft using a retaining ring in an outwardly facing groove of the shaft. For use during disassembly, the star shaped sleeve has a transition chamfer surface that centers the retaining ring, separate from a ramp chamfer surface that compresses the retaining ring into the groove deeper than the splines. A limit slide surface may exist between the transition chamfer surface and the ramp chamfer surface, at a diameter which slightly compresses the retaining ring but allows the disassembler to clearly feel the ramp chamfer surface. For use during assembly, the star shaped sleeve has an assembly chamfer surface that compresses the retaining ring into the groove deeper than the splines, using a different assembly assist chamfer angle than either the transition angle or the ramp angle.

BRIEF DESCRIPTION OF THE DRAWINGS

FIG. 2 is a side view, in partial cross-section, of a prior art half shaft, including two CV joints, one of which is cylindrical to allow some lengthwise dynamic movement of the joint.

FIG. 3 is a side view, in partial cross-section, of the cylindrical dynamic-length CV joint of FIG. 2, in a lengthened position.

FIG. 4 is a side view, in partial cross-section, of the cylindrical dynamic-length CV joint of FIGS. 2 and 3, in a shortened position.

FIG. 5 is a side view, in partial cross-section, of a half shaft in accordance with the present invention.

FIG. 6 is a side view, in partial cross-section, of the dynamic-length CV joint of FIG. 5, in a lengthened position.

FIG. 7 is a side view, in partial cross-section, of the dynamic-length CV joint of FIG. 6, in a shortened position.

FIG. 8 is a side view of the star shaped inner joint member of FIGS. 5-7.

FIG. 9 is a perspective view the star shaped inner joint member of FIGS. 5-8.

Figure 1:
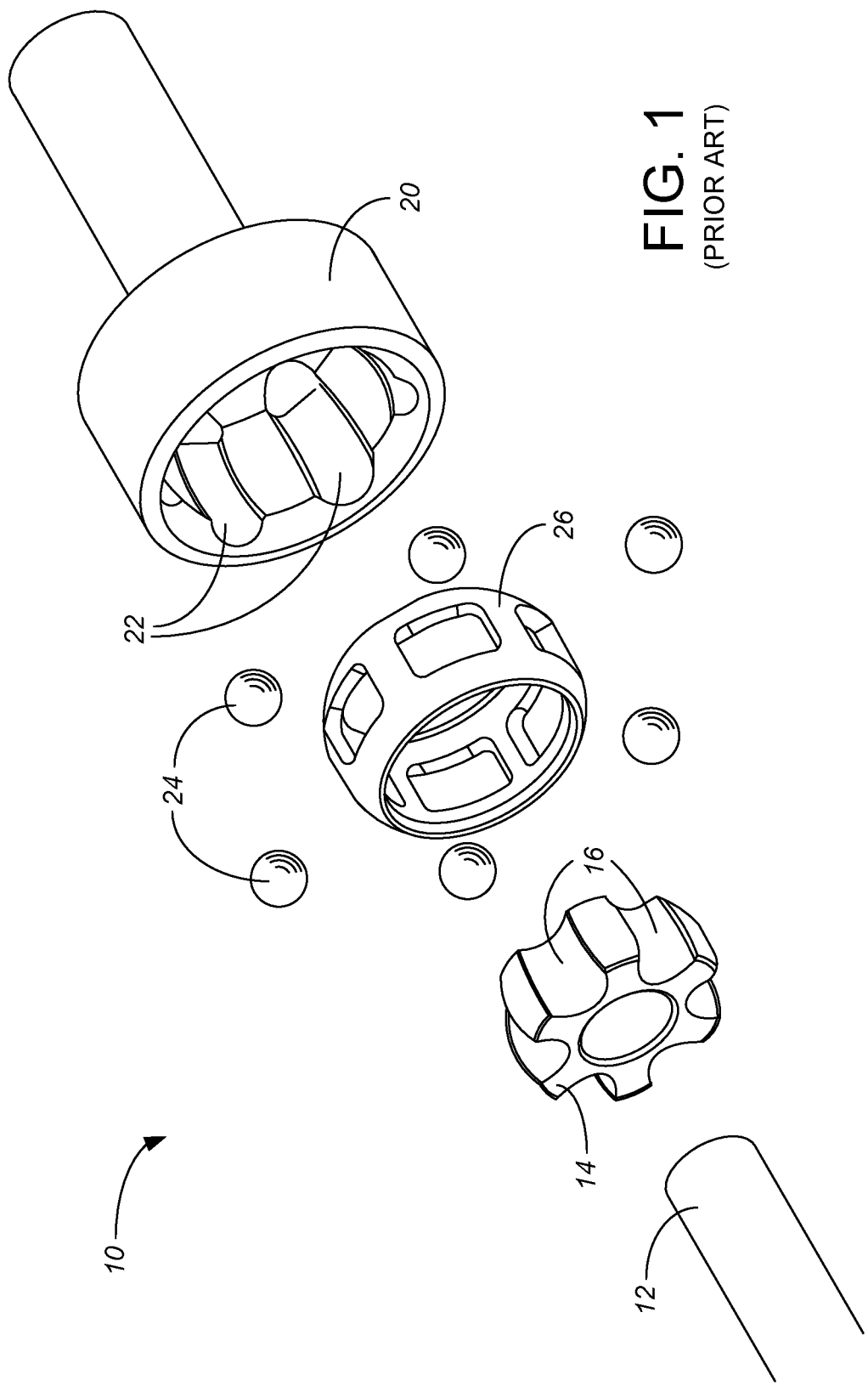
FIG. 1 is an exploded perspective view of a prior art CV joint.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

The present invention is shown in FIG. 5 as used as part of a half-shaft 36, which can be positioned between a differential (not shown) and a hub of a driven wheel (not shown) on an all terrain or similar off road vehicle. The invention could alternatively be employed anywhere a. CV joint is useful. In this example, the half-shaft 36 includes a first CV joint 38 at left (in the preferred embodiment, its outer end near where it connects to the wheel hub) which is fixed-lengthwise, and a second CV joint 40 at right (in the preferred embodiment, its inner end near where it connects to the differential) which is dynamic lengthwise. Both the fixed-length CV joint 38 and the dynamic-length CV joint 40 include a set of ball bearings 24 maintained in place with a ball cage 26, and the set of ball bearings 24 and ball cage 26 can be similar to the prior art and identical between the two CV joints 38, 40. To the inside of the ball bearings 24, each CV joint 38, 40 includes a star shaped sleeve 42. The outwardly facing surface 16 between each set of adjacent arms of the star shaped sleeve 42 is spherical, providing an inner raceway 16 for its ball 24, allowing the ball cage 26 to pivot relative to the star shaped sleeve 42 about the center of the sphere. To the outside of the ball bearings 24, each CV joint 38, 40 includes a shell 44, 46 with a star shaped recess. The inwardly facing surface 22 between each set of adjacent arms of the star shaped recess is spherical, providing an outer raceway 22 for its ball 24, allowing the shell 44, 46 to pivot relative to the ball cage 26 about the center of the sphere. Typically the balls 24, the star shaped sleeves 42 and the shells 44, 46 will all be formed of hardened steel, strong enough that the balls 24 transfer rotational motion and torque between the star shaped sleeve 42 and the shell 44, 46.

Unlike the prior art cylindrical CV joint 30, both of the shells 44, 46 of the CV joints 38, 40 provide outer races 22 for the balls 24 which are spherical. As understood with ball CV joints, the confluence between the star shaped sleeve 42, the ball cage 26, the shell 44, 46 and the balls 24 are such that the star shaped sleeve 42 can only be assembled into the cage 26 and the cage 26 can only be assembled into the shell 44 or 46 when both the shaft 36 and the balls 24 are absent, and the balls 24 can only be assembled into the sleeve/cage/shell combination 42/26/44 or 46 when the shaft 36 is absent, i.e., the last step in assembly is inserting the shaft 36 into the sleeve 42, and the first step of disassembly is removing the shaft 36 from the sleeve 42.

As noted, the preferred embodiment uses one CV joint 38 that is fixed in the lengthwise direction, and the star shaped sleeve 42 of the fixed-length CV joint 38 can be attached to the shaft 36 in any convenient way to secure the fixed-length attachment. For instance, the star shaped sleeve 42 of the fixed-length CV joint 38 can be attached with a bolt (not shown), or alternatively can be attached via splines 48, 50 and using a retaining ring 52 as further discussed below for the dynamic-length CV joint 40. The difference between the preferred fixed-length shell 44 and the preferred dynamic-length shell 46 is that the recess in the dynamic-length shell 46 is deeper to account for shorter lengths of the joint, but the shell in the fixed-length joint could alternatively be identical to the dynamic-length shell 46, with the downside of increased weight. The difference in the two ends of the half-shaft 36 is that splines 50 are shorter than splines 54, but splines 50 could alternatively be made longer so both joints permitted lengthwise adjustment.

Figure 10:
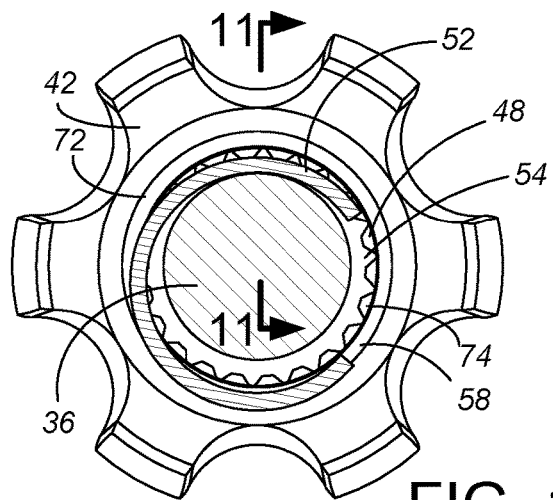
FIG. 10 is a cross-sectional view of the half shaft, star shaped inner joint member and retaining ring of FIGS. 5-7, taken along line 10-10 in FIG. 11, during the unimpeded lengthwise movement of the star shaped inner joint member on the half shaft.
Figure 11:
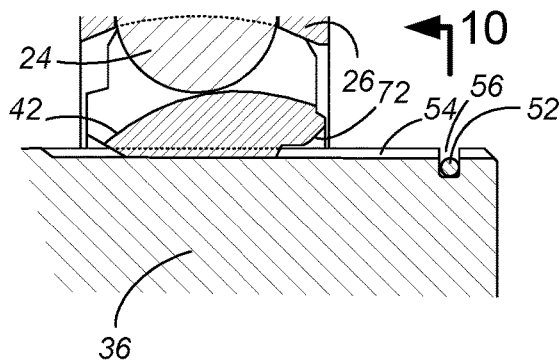
FIG. 11 is a cross-sectional end view of the half shaft assembly of FIGS. 5-7, taken through the groove and retaining ring along line 11-11 in FIG. 10, and further showing a portion of the ball and the ball cage.
Figure 12:
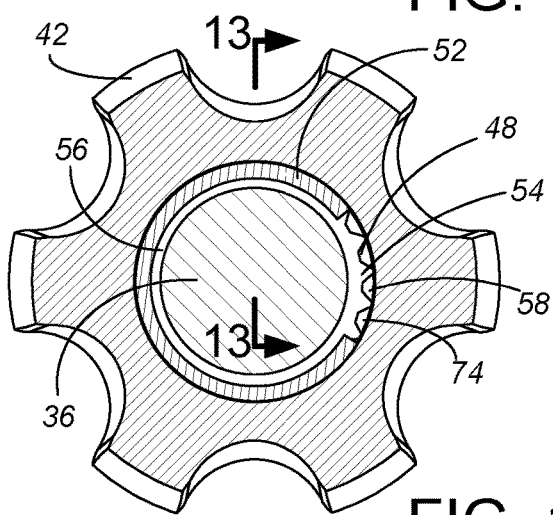
FIGS. 12 and 13 are cross-sectional views similar to FIGS. 10 and 11, during a first part of the disassembly process.
Figure 13:
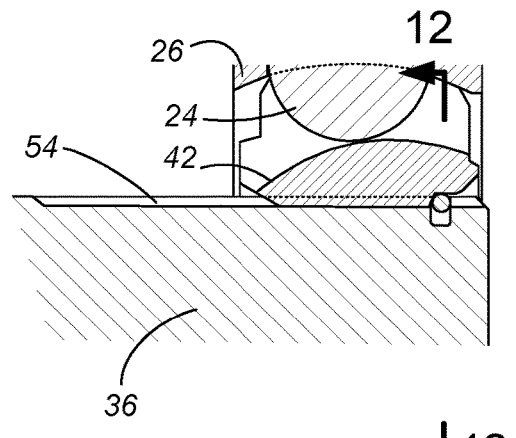
Figure 14:
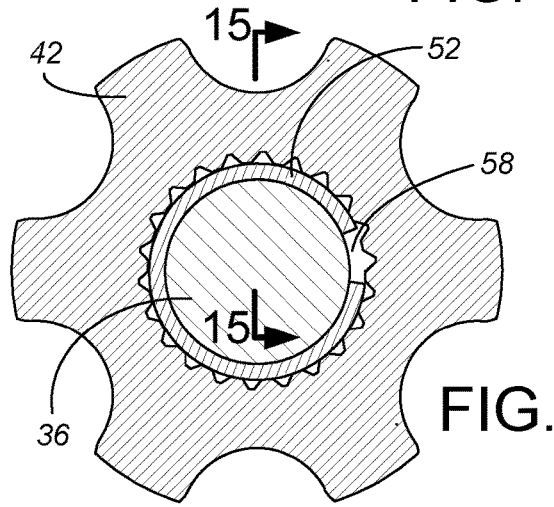
FIGS. 14 and 15 are cross-sectional views similar to FIGS. 10 and 11, during a second part of the disassembly process.
Figure 15:
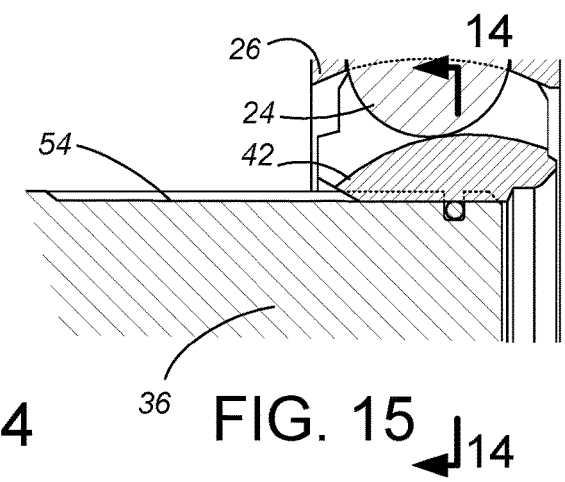

In the dynamic-length CV joint 40 as depicted more clearly in FIGS. 6, 7 and 11, the star shaped sleeve 42 can slide axially on the half shaft 36, but then is attached to prevent the star shaped sleeve 42 from coming off the half shaft 36 during ordinary operation. In the preferred embodiment, the attachment in the dynamic-length CV joint 40 is via a retaining ring 52 in association with an outwardly facing groove 56 on the shaft 36. The groove 56 should be deep enough to receive the entirety of the retaining ring 52 at a smaller diameter than the inside diameter of the splines 48 of the star shaped sleeve 42. The retaining ring 52 is not a 360° complete circle, but rather includes an open separation or gap 58 along its circumference, best shown in FIGS. 10, 12 and 14. Alternatively, and particularly if the retaining ring is not formed from cylindrical wire, the retaining ring could extend around more than 360°, provided the overlapping ends of the retaining ring can still fit within the groove 56 and slide past each other so the retaining ring can change diameter. The retaining ring 52 preferably has an unbiased outer diameter which is larger than the shaft diameter (i.e., larger than the outer diameter of the splines 54), and an unbiased inner diameter which is smaller than the shaft diameter. During assembly of the retaining ring 52 onto the half shaft 36, the retaining ring 52 is expanded so its inner diameter fits over the end of the shaft 36 and then compresses under its own spring force partially back inward into the groove 56. To assemble the star shaped sleeve 42 onto the half shaft 36, the retaining ring 52 is then pushed further inward in the groove 56 until the outer diameter of the retaining ring 52 is smaller than the inner diameter of the star shaped sleeve 42. The star shaped sleeve 42 has an inward facing groove 60. When the shell/cage/balls/star shaped sleeve combination 44/26/24/42 is advanced onto the shaft 36 to the correct axial position shown at left in FIG. 5, the retaining ring 52 snaps outward into the inwardly facing groove 60 of the star shaped sleeve 42, while still being partially within the groove 56 of the shaft 36. By being partially within the groove 56 of the shaft 36 and simultaneously partially within the groove of the star shaped sleeve 42, the retaining ring 52 prevents the star shaped sleeve 42 from moving axially off of the half shaft 36.

The mechanism for lengthwise adjustment in the dynamic-length CV joint 40 is by sliding engagement of splines 48 of the star shaped sleeve 42 and splines 54 of the shaft 36. For instance, as best shown in FIG. 8, the preferred embodiment utilizes a series of twenty-two circumferentially spaced splines 48 in the connection between the star shaped sleeve 42 and the half shaft 36. The preferred splines 48 have a wide angle contact faces 62, called out as angle $\alpha$ in FIG. 8, used to transmit torque between the shaft 36 and the star shaped sleeve 42. In the preferred embodiment this wide angle $\alpha$ is in the range of 60° to 135°, most preferably about 100°. By having such a wide angle $\alpha$ to the torque transmitting faces 62, there is less chance of binding of the splines 48, 54, allowing axial sliding of the star shaped sleeve 42 on the shaft 36 until the star shaped sleeve 42 contacts the retaining ring 52. The wide angle contact faces 62 are separated by faces 64, 66 which do not transmit torque. In the preferred embodiment, both the inner faces 64 and the outer faces 66 are planar, although they could alternatively be cylindrical about the shaft axis. Separating the wide angle contact faces 62 by faces 64, 66 which do not transmit torque also assists in permitting axial sliding of the star shaped sleeve 42 on the shaft 36.

The dimensions of the half shaft 36, the star shaped sleeve 42, the balls 24 and the shell 46 are all appropriately selected to function with each other while being sufficiently strong to withstand the forces they will be subjected to for an off road vehicle use. For instance, the half shaft 36 can be machined out of a solid steel cylindrical bar of 25 mm diameter, with each of the six balls 24 being 15 mm in diameter, and with the shell 46 having an outer diameter of about 76 mm. The depth of the splines 48, 50. 54 needs to be great enough to transfer the torque required in the field of use. In the preferred embodiment, the outer faces 66 collectively define a major diameter of about 24 mm, and the inner faces 64 collectively define a minor diameter of about 22 mm, i.e., the splines 48, 50. 54 are each about 1 mm tall.

Figure 16:
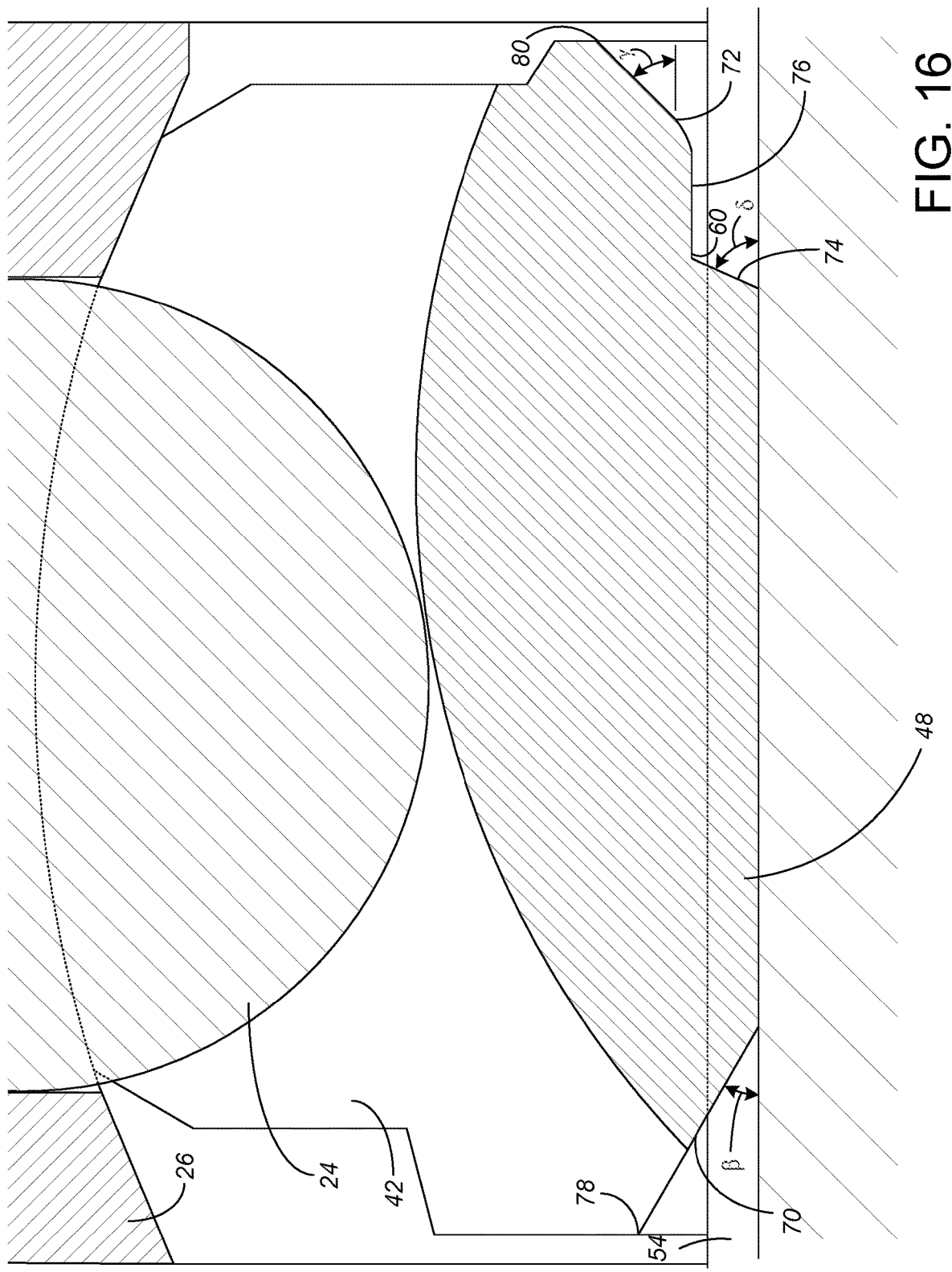
FIG. 16 is an enlargement of a portion of FIG. 11.
Figure 17:
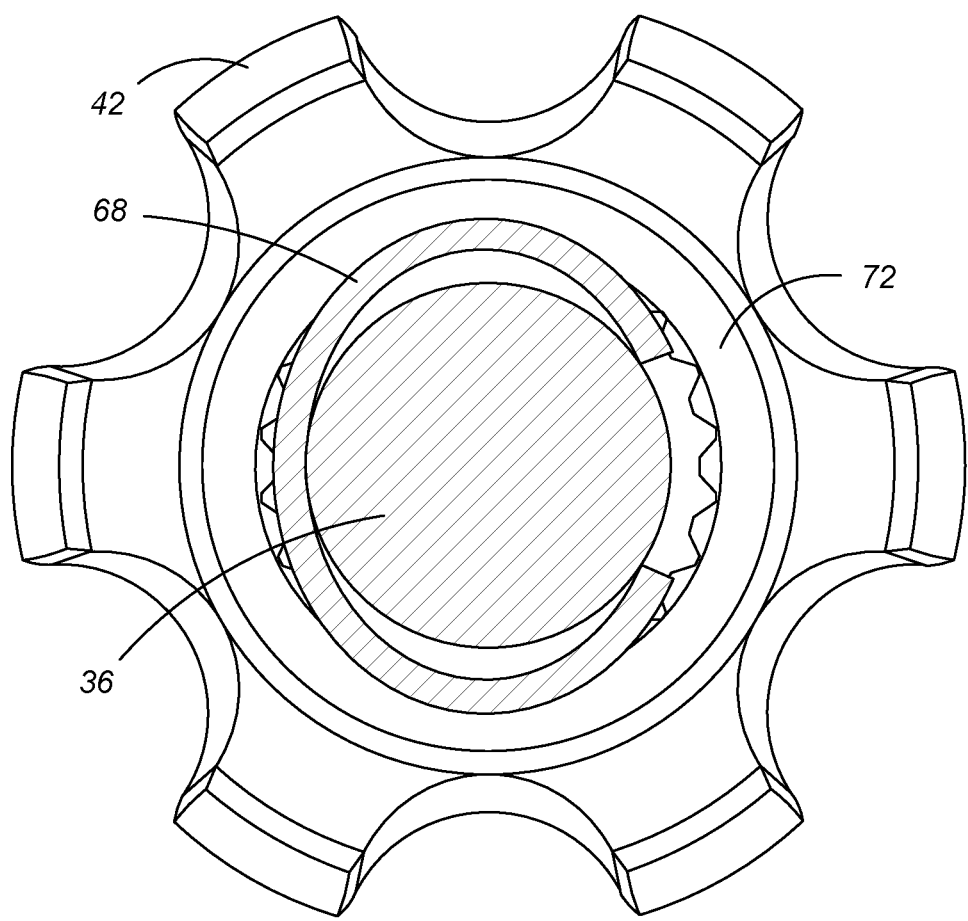
FIG. 17 is a cross-sectional end view of a half shaft assembly incorporating the present invention using an alternative retaining ring.

The dynamic star shaped sleeve 42 is limited from sliding off the end of the half shaft 36. In the preferred embodiment, the limitation is provided by a retaining ring, with preferred embodiments best shown in FIGS. 10-15 and 17. The retaining ring must be formed of a shape retaining material that provides an appropriate spring force. The preferred retaining rings 52, 68 have either a circular profile (FIG. 10-15) or an elliptical profile (FIG. 17). The retaining ring 52 does not extend 360° around the half shaft 36, but does extend more than 180° around the half shaft 36 so it is self-retaining on the half shaft 36 with a gap 58. For instance, the preferred retaining rings 52, 68 are formed of steel wire, originally cylindrical in cross-section, bent into either the circular profile (FIGS. 10-15) or the elliptical profile (FIG. 16). When formed of steel wire, a diameter of 1.6 mm has been found to provide an adequate spring force for assembly and disassembly. Alternatively, the retaining rings could be stamped or otherwise formed with a rectangular or other polygonal cross-section.

The half shaft 36 includes a groove 56, at the end of the splines 54, for receiving the retaining ring 52. The groove 56 needs to be deep enough and wide enough to fully encompass the retaining ring 52, below the minor diameter of the splines 54. In the preferred embodiment, the groove 56 extends 360° around and encircles the half shaft 36. When used with a 1.6 mm diameter retaining ring 52, the groove 56 can be about 1.8 mm wide, with a diameter at the bottom of the groove 56 of about 18.7 mm, i.e., about 2.65 mm deep relative to the 24 mm major diameter of the splines 54. At that depth, the retaining ring 52 can be compressed down within the groove 56 to an outer diameter of about 21.9 mm.

The thickness of the retaining ring 52 and the difference between its free state diameter and its compressed diameter within the groove 56 contribute to the preferred size of the gap 58. For instance, the gap 58 is preferably at least 40°, so there is no interference in circumferential length even when the retaining ring 52 is fully compressed into the groove 56. In the most preferred embodiments the retaining ring 52 in its free state extends about 285° around the half shaft 36, leaving a gap 58 of about 75°. At a free state outer diameter of 25 mm, the retaining ring 52 can start as a wire about 59 mm in length. When compressed in the groove 56 to an outer diameter of only 21.9 mm, the gap 58 decreases down to about 30°.

The star shaped sleeve 42 includes chamfer surfaces 70, 72, 74 which are important toward assembly and disassembly using the retaining ring 52 in the groove 56. In the most preferred embodiment as best called out in FIG. 16, the star shaped sleeve 42 includes one assembly chamfer surface 70, as well as two disassembly chamfer surfaces 72, 74 and a limit slide surface 76 (which doubles as the groove 60 when used in the fixed-length CV joint 38). The outer disassembly chamfer surface 72 is referred to as a "transition" while the inner disassembly chamfer surface 74 is referred to as a "ramp". All three chamfer surfaces 70, 72, 74 are preferably conical.

The assembly chamfer surface 70 is used to assist in compressing the retaining ring 52 into the groove 56 during assembly of the dynamic-length CV joint 40. In the preferred embodiment, the assembly chamfer surface 70 has an assembly assist angle $\beta$ which is used during pushing the star shaped sleeve 42 onto the shaft 36. The assembly assist angle $\beta$ is preferably within the range of 10° to 80°, with a most preferred value of 30°. The edge 78 which defines the start of the assembly chamfer surface 70 should have a diameter at least approximately equal to the free state outer diameter of the retaining ring 52, for the preferred embodiment at least about 25 mm. During assembly, the retaining ring 52 is somewhat hand centered relative to the groove 56 and thereby somewhat centered relative to the start edge 78 of the star shape sleeve 42 as the star shaped sleeve 42 is axially advanced onto the half shaft 36. The assembly chamfer surface 70 then contacts the retaining ring 52 and further biases the retaining ring 52 inward into the groove 56 (overcoming the outward spring force of the retaining ring 52) until the entirety of the retaining ring 52 is smaller in diameter than the minor diameter of the splines 48. The assembly chamfer surface 70 thus makes compressing the retaining ring 52 easier than prior art assembly methods which required a separate compression force on the retaining ring 52 during the assembly process.

The two disassembly chamfer surfaces 72, 74 and the limit slide surface 76 are important in understanding how the retaining ring 52 functions both during significant/maximum run out and during disassembly. Firstly, it should be understood that during normal suspension travel and/or turning, the run out and the amount of lengthwise change required of the dynamic-length CV joint 40 is fairly limited. The preferred embodiment has a free lengthwise slide stroke of about 60 mm, i.e., from its shortest position in which the splines 48 of the star shaped sleeve 42 are fully engaged with the splines 54 of the half shaft 36 to the longest position when the star shaped sleeve 42 contacts the retaining ring 52, the travel distance of the star shape sleeve 42 on the half shaft 36 is about 60 mm. As shown in FIG. 10, the retaining ring 52 merely hangs within the groove 56 and serve no essential purpose during this normal operation of the vehicle, but instead only contacts the star shaped sleeve 42 upon significant (in excess of 60 min) run out/turning or during intentional disassembly.

When the lengthwise extension of the dynamic-length CV joint 40 exceeds this free lengthwise slide stroke, the disassembly transition chamfer surface 72 will contact the retaining ring 52. The retaining ring 52 during disassembly is fully encased within the shell 46 without any way to hand move the retaining ring 52 to a centered position. A primary purpose of the disassembly transition chamfer surface 72 is to lift the retaining ring 52 out of any hanging relationship in the groove 56 and center the retaining ring 52 relative to the half shaft 36, thereby avoiding any binding of the retaining ring 52 due to any portion of the circumference of the retaining ring 52 being fully outside the groove 56. The potential for binding is even more apparent with the embodiment of FIG. 16, where it is possible for the elliptical retaining ring to expand, leaving the bottom of the C shape hanging below the major diameter of the splines 54 on the shaft 36. Because the retaining ring 52 has a free inside diameter Which is significantly greater than the base diameter of the groove 56, the transition edge 80 should have a diameter which will receive the retaining ring 52 in any hanging relationship, i.e., greater than the diameter of the assembly start edge 78. Like the assembly assist angle β, the disassembly transition angle γ is preferably within the range of 10° to 80°. However, because of the greater diameter of the transition edge 80, the disassembly transition angle γ is preferably greater than the assembly angle β. In the most preferred embodiment, the disassembly transition angle γ is 45°, extending out to a transition edge 80 which is about 28 mm in diameter or greater.

The recognizably large diameter of the transition edge 80 also plays a role during assembly of the CV joint 40. Namely, note that, unlike many prior art star shaped sleeves, the preferred star shaped sleeve 42 is not bilaterally symmetrical. During assembly, the star shaped sleeve 42 needs to be oriented such that the transition chamfer surface 72 faces the same way as the end of the half shaft 36, with the assembly chamfer surface 70 facing the long center of the half shaft 36. Because the surfaces of the star shaped sleeve 42 function very differently during assembly as compared to disassembly, it is very important that the star shaped sleeve 42 be oriented correctly during assembly. The large transition edge diameter is easily recognized during assembly to distinguish one side of the star shaped sleeve 42 from the other, for proper orientation.

During disassembly sliding of the star shaped sleeve 42 off the end of the half shaft 36, after the disassembly transition chamfer surface 72 has centered the retaining ring 52 relative to the half shaft 36, the disassembly transition chamfer surface then begins compressing the retaining ring 52 into the groove 56. In the preferred embodiment, this amount of compression is not too great before the outer diameter of the retaining ring 52 matches the inner or smallest diameter of the disassembly transition chamfer surface 72. For instance, with a preferred retaining ring 52 having a free state outer diameter of 25 mm, the inner or smallest diameter of the disassembly transition chamfer surface 72 can be 24.5 mm. Thus, with a preferred disassembly transition angle γ of 45°, there is only 0.5 mm of sliding travel of the star shaped sleeve 42 on the half shaft 36 in which the disassembly transition chamfer surface 72 causes compression of the retaining ring 52 (overcoming the spring force of the retaining ring 52 and friction) from an outer diameter of 25 mm to an outer diameter of 24.5 mm.

Past the conical disassembly transition chamfer surface 72, the preferred embodiment of the star shaped sleeve 42 has a limit slide surface 76 which is cylindrical rather than conical. The preferred limit slide surface 76 has an axial length of just over 2 mm, at a 24.5 inner diameter. The limit slide surface 76, including the fact that it has an inner diameter smaller than the free outer diameter of the retaining ring 52, plays an important tactile role in disassembly sliding of the star shaped sleeve 42 off the end of the half shaft 36. Namely, the worker performing the disassembly can feel the spring force of compressing the retaining ring 52 to fit within the limit slide surface 76 and then can identify the further axial sliding (without further compression of the retaining ring 52) until the retaining ring 52 contacts the disassembly ramp chamfer surface 74. This tactile feel assures the worker performing the disassembly of just where the star shaped sleeve 42 is in sliding off the half shaft 36, so proper disassembly forces are applied at the correct time and reducing the likelihood of damage to the CV joint (particularly to the star shape sleeve 42 or to the splines 54 of the half shaft 36) during disassembly. Note that the longer the limit slide surface 76 is axially, the shorter the splines 48 on the star shaped sleeve 42 are. Thus, the axial length of the limit slide surface 76 is chosen as a balance between the benefit of the enhanced tactile feel during disassembly versus the detriment of having shorter splines 48 to transmit torque, if desired, the limit slide surface 76 could alternatively be omitted to preserve maximum length of the splines 48 on the star shaped sleeve 42.

The ramp surface 74 is where further significant compression of the diameter of the retaining ring 52 is required, into the groove 56 deeper than the splines 48. The angle δ of the ramp surface 74 is selected to achieve such compression, preferably at a greater angle than the assembly chamfer angle β or the transition chamfer angle γ. Having a higher ramp angle δ ensures that disassembly will only occur intentionally, by pulling on the shell 46 or pushing on the star shaped sleeve 42 in the axial direction with a force that uses the ramp angle δ to overcome the spring force of the retaining ring 52 as well as friction for compressing the diameter of the retaining ring 52. Having too high of a ramp angle δ increases the forces required for disassembly and makes damage during disassembly more likely. For instance, the angle δ of the ramp surface 74 can be in the range of 45° to 80°, with a most preferred ramp angle δ being 65°.

Note that the angles β, γ, δ discussed herein for the assembly chamfer, the transition chamfer and the ramp chamfer are all based on a retaining ring 52 with a circular cross-section. If a different cross-section of retaining ring is used, the angle of the surface of the retaining ring which contacts different edges or faces of the star shaped sleeve 42 can be used to generate the compressive force reducing the diameter of the retaining ring into the groove 56, instead of or in addition to the angles discussed herein for the assembly chamfer, the transition chamfer and the ramp chamfer. In all cases, the important consideration is the interplay between the retaining ring and the surfaces of the star shaped sleeve 42 which contact the retaining ring during assembly and disassembly by sliding the star shaped sleeve 42 onto or off of the end of the half shaft 36.

With the present invention, both assembly and disassembly using the retaining ring 52 is easy and quick. Disassembly and repair can be achieved without needing to cut off or remove the retaining ring 52, which could be extremely difficult or impossible while the retaining ring 52 is inside the shell 46. The CV half shaft 36 provides both the high degree of angular articulation and the limited amount of lengthwise extension to satisfy the use requirements of the all-terrain vehicle with large travel and high strength. The ball bearings 24 and the races 16, 34 are subjected to smaller pressures during torque transmission than with the cylindrical CV joint 30, and the entire structure has higher reliability.

Although the present invention has been described with reference to preferred embodiments, workers skilled in the art will recognize that changes may be made in form and detail without departing from the spirit and scope of the invention.

The invention claimed is:

1. A constant velocity joint comprising:
    a shaft having an outwardly facing groove on a distal end of the shaft;
    a star shaped sleeve having a splined connection around the shaft for transmission of torque between the shaft and the sleeve, the sleeve having a periphery providing a plurality of inner races, the splined connection allowing the star shaped sleeve to slide axially on the shaft at a location proximal to the groove while transmitting torque;
    a shell with a star shaped recess providing a corresponding plurality of outer races;
    a plurality of balls riding between the inner races and the outer races for transmission of torque between the sleeve and the shell during angular articulation of the shaft relative to the shell; and
    a retaining ring positionable within the groove for use in securing the sleeve to the shaft while permitting the sleeve to slide axially on the shaft;
    wherein the sleeve comprises an assembly chamfer surface which can bias the retaining ring inward into the groove during assembly of the sleeve onto the shaft, and a disassembly chamfer surface having a different profile than the assembly chamfer surface and which can bias the retaining ring inward into the groove during disassembly of the sleeve off of the shaft, with neither the assembly chamfer surface nor the disassembly chamfer surface contacting the retaining ring during working of the constant velocity joint.

2. The constant velocity joint of claim 1, wherein the disassembly chamfer surface comprises:
    a transition chamfer surface angled at a transition chamfer angle relative to a longitudinal direction that the sleeve slides onto and off of the shaft during assembly and disassembly; and
    a ramp chamfer surface angled at a ramp chamfer angle relative to the longitudinal direction that the sleeve slides onto and off of the shaft during assembly and disassembly, wherein the ramp chamfer angle is greater than the transition chamfer angle.

3. The constant velocity joint of claim 2, wherein the assembly chamfer surface is angled at an assembly assist chamfer angle relative to a longitudinal direction that the sleeve slides onto and off of the shaft during assembly and disassembly, wherein the transition chamfer angle is greater than the assembly assist chamfer angle.

4. The constant velocity joint of claim 3, wherein the ramp chamfer angle is greater than 45°.

5. The constant velocity joint of claim 4, wherein the assembly assist chamfer angle is less than 45°.

6. The constant velocity joint of claim 5, wherein the ramp chamfer angle is 65°, wherein the transition chamfer angle is 45°, and wherein the assembly assist chamfer angle is 30°.

7. The constant velocity joint of claim 3, wherein the assembly chamfer surface, the transition chamfer surface and the ramp chamfer surface are all conical.

8. The constant velocity joint of claim 2, wherein the sleeve further comprises a slide surface between the transition chamfer surface and the ramp chamfer surface.

9. The constant velocity joint of claim 8, wherein the slide surface has an inner diameter which is less than a free state outer diameter of the retaining ring.

10. The constant velocity joint of claim 1, wherein both the inner races and the outer races define a spherical profile about a pivot center of the joint.

11. The constant velocity joint of claim 1, further comprising a ball cage between the sleeve and the shell, the ball cage holding the balls within the space between the inner and outer races.

12. The constant velocity joint of claim 1, wherein the retaining ring has a free state outer diameter which is greater than an outer diameter of the groove, and wherein the retaining ring has a free state inner diameter which is less than an outer diameter of the groove and greater than an inner diameter of the groove, with the retaining ring being in its free state during working of the constant velocity joint.

13. The constant velocity joint of claim 12, wherein the retaining ring is formed of wire having a circular cross-section, with a diameter of the wire being smaller than a width of the groove, wherein the disassembly chamfer surface comprises:
    a transition chamfer surface angled at a transition chamfer angle relative to a longitudinal direction that the sleeve slides onto and off of the shaft during assembly and disassembly, the transition chamfer surface being at a radius from an axis of the shaft such that during disassembly the transition chamfer surface centers the retaining ring relative to the shaft.

14. The constant velocity joint of claim 1, wherein the splined connection has wide angle contact faces, with angles between adjacent contact faces which transmit torque in a forward direction and contact faces which transmit torque in a reverse direction being in the range of 60° to 135°.

15. The constant velocity joint of claim 14, wherein the wide angle contact faces are separated by inner faces which do not transmit torque and by outer faces which do not transmit torque.

16. A method of disassembly of a constant velocity joint comprising:
    longitudinally advancing a star shaped sleeve toward the end of a shaft, the star shaped sleeve having a splined connection around the shaft for transmission of torque between the shaft and the sleeve, the sleeve having a periphery providing a plurality of inner races, the sleeve being within a shell with a star shaped recess providing a corresponding plurality of outer races, with a plurality of balls riding between the inner races and the outer races for transmission of torque between the sleeve and the shell during angular articulation of the shaft relative to the shell, the shaft having an outwardly facing groove, with a retaining ring within the groove, such that the longitudinal advancement causes a transition chamfer surface of the sleeve to contact and center the retaining ring relative to the groove and the shaft, the transition chamfer surface having a transition chamfer angle relative to the direction of longitudinal advancement;

further advancing the sleeve toward the end of the shaft, until the retaining ring contacts a ramp chamfer surface of the sleeve, the ramp chamfer surface being angled at a ramp chamfer angle relative to the direction of longitudinal advancement, wherein the ramp chamfer angle is greater than the transition chamfer angle; and further advancing the sleeve toward the end of the shaft such that the ramp chamfer surface biases and compresses the retaining ring inwardly into the groove.

17. The method of claim 16, wherein, when the ramp chamfer surface biases and compresses the retaining ring inwardly into the groove, the retaining ring has a circumferential gap which is smaller than a free state circumferential gap of the retaining ring.

* * * * *